US011265625B1

(12) United States Patent
Carmichael et al.

(10) Patent No.: US 11,265,625 B1
(45) Date of Patent: Mar. 1, 2022

(54) AUTOMATED SELF-CONTAINED HOOKAH SYSTEM WITH UNOBSTRUSIVE AQUATIC DATA RECORDING

(71) Applicant: BLU3, INC., Pompano Beach, FL (US)

(72) Inventors: Robert M. Carmichael, Pompano Beach, FL (US); Wesley Siebenthal, Orcutt, CA (US); Blake Carmichael, Fort Lauderdale, FL (US)

(73) Assignee: BLU3, INC., Pompano Beach, FL (US)

( * ) Notice: Subject to any disclaimer, the term of this patent is extended or adjusted under 35 U.S.C. 154(b) by 329 days.

(21) Appl. No.: 16/211,220

(22) Filed: Dec. 5, 2018

Related U.S. Application Data

(60) Provisional application No. 62/657,840, filed on Apr. 15, 2018, provisional application No. 62/594,940, filed on Dec. 5, 2017.

(51) Int. Cl.
*H04Q 9/00* (2006.01)
*B63C 11/20* (2006.01)
*B63C 11/02* (2006.01)

(52) U.S. Cl.
CPC .............. *H04Q 9/00* (2013.01); *B63C 11/02* (2013.01); *B63C 11/202* (2013.01); *B63C 2011/021* (2013.01); *H04Q 2209/40* (2013.01)

(58) Field of Classification Search
CPC ......... B63C 11/00; B63C 11/02; B63C 11/12; B63C 11/14; B63C 11/18; B63C 11/186–202; B63C 11/26; B63C 11/52; B63C 2011/021; B63C 2011/026–027; B63G 2008/005; B63G 2008/007; B63G 8/08; B63G 8/14; G01V 1/3843; G10K 11/006; H04Q 9/00; H04Q 9/14–16
See application file for complete search history.

(56) References Cited

U.S. PATENT DOCUMENTS

| 4,348,976 A | * | 9/1982 | Gilbert | A63B 35/12 |
| | | | | 114/315 |
| 2008/0156327 A1 | * | 7/2008 | Hollis | B63C 11/02 |
| | | | | 128/204.21 |
| 2009/0056718 A1 | * | 3/2009 | Lindgren | B63C 11/202 |
| | | | | 128/204.18 |

(Continued)

*Primary Examiner* — Rachel T Sippel
(74) *Attorney, Agent, or Firm* — Daniel S. Polley, P.A.

(57) ABSTRACT

A self-contained surface supplied air system preferably provided with backpack-wearable capability and automated setup functions for ease of use that is capable of recording valuable recreational and scientific data in an unobtrusive manner. The flotation tube process for the system can be automated to reduce setup time and electronically regulated to increase reliability and safety. The system allows recreational divers or their inherent equipment to be capable of recording valuable and reputable data in a manner that does not involve extra effort by the user. The disclosed system can use a miniature pH sensor design with automatic calibration for integration into the data recording device. In one embodiment, the novel hookah diving system comprises a portable body enclosing all necessary equipment and featuring automatic flotation tube inflation and deflation. An integrated data recording device collects physical data at points along the diver's tether preferably from the surface all the way to the depth of the diver.

13 Claims, 15 Drawing Sheets

Air Delivery Hose with Wireless Receiver

(56) References Cited

U.S. PATENT DOCUMENTS

| | | | | |
|---|---|---|---|---|
| 2010/0226204 | A1* | 9/2010 | Gagliardi | B63B 3/14 |
| | | | | 367/16 |
| 2016/0297506 | A1* | 10/2016 | Duckworth | B63J 3/04 |
| 2016/0347432 | A1* | 12/2016 | Smith | B63C 11/202 |
| 2016/0367779 | A1* | 12/2016 | Landis | A61M 16/1075 |
| 2017/0235005 | A1* | 8/2017 | Dons | G01V 1/3808 |
| | | | | 367/15 |
| 2017/0253313 | A1* | 9/2017 | Easterling | B63G 8/001 |
| 2018/0292208 | A1* | 10/2018 | Moore | G01C 13/008 |
| 2018/0362129 | A1* | 12/2018 | Colborn | B63C 11/202 |

* cited by examiner

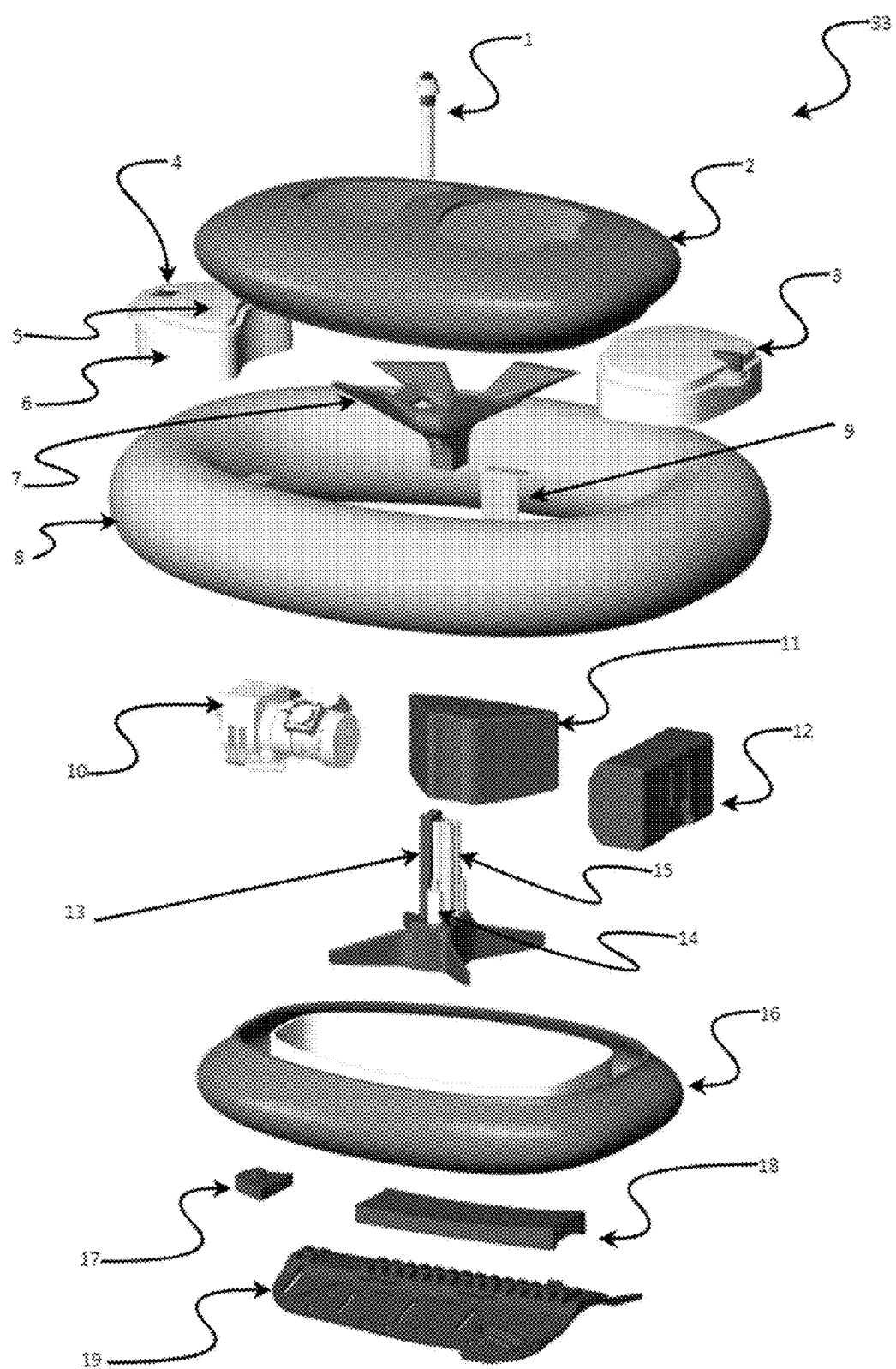
Figure 1: Exploded View

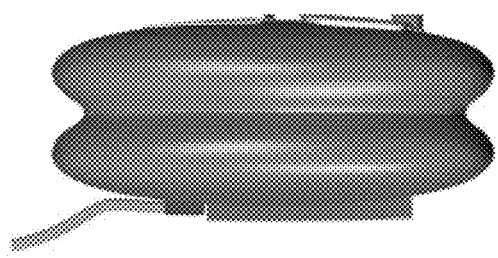
Figure 2.1
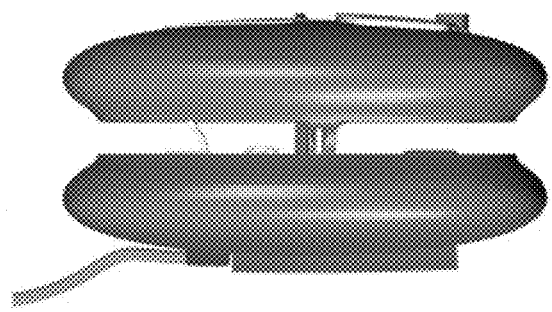
Figure 2.4
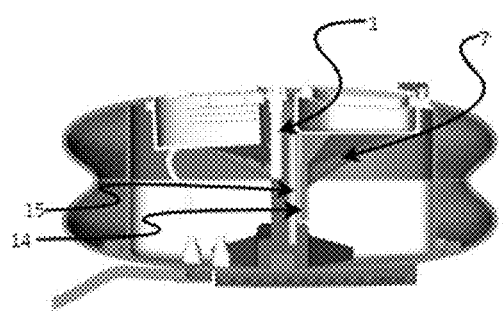
Figure 2.2
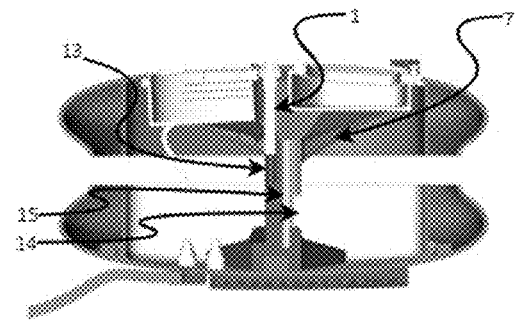
Figure 2.5
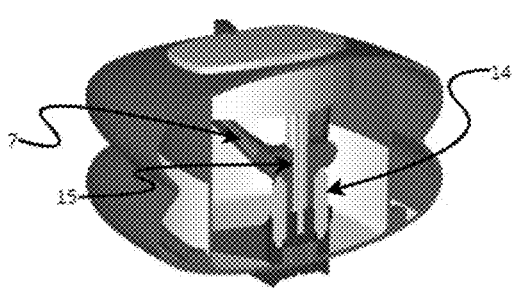
Figure 2.3
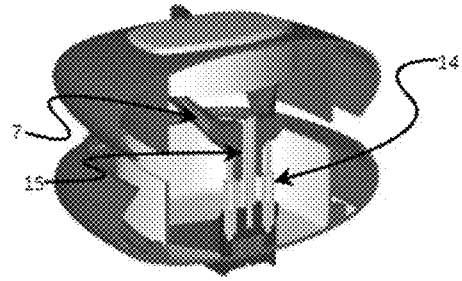
Figure 2.6
Figure 2: Opening (right) and Closing (left) of Upper Body

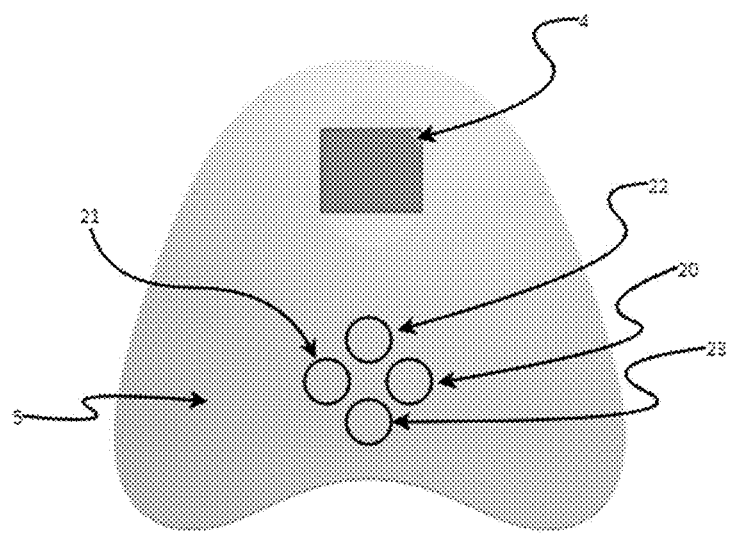
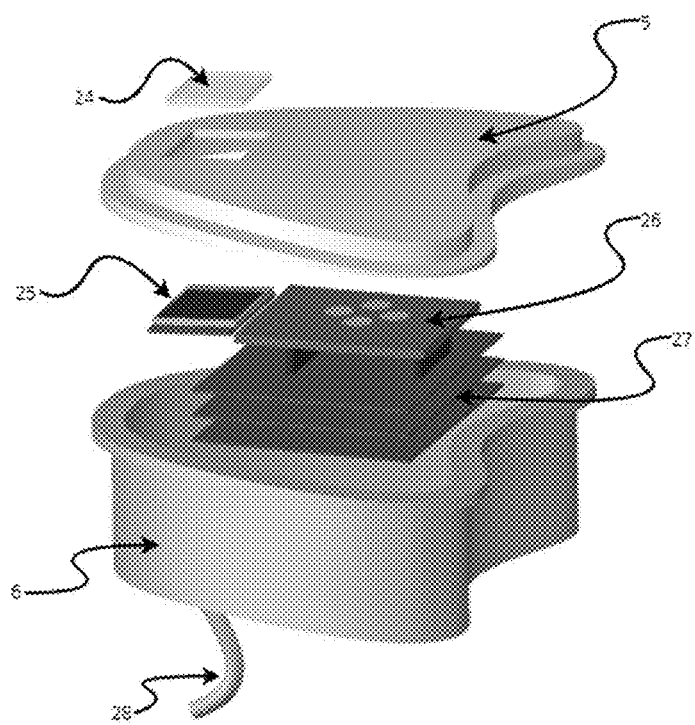
Figure 3: User Interface Panel and Electronics Housing

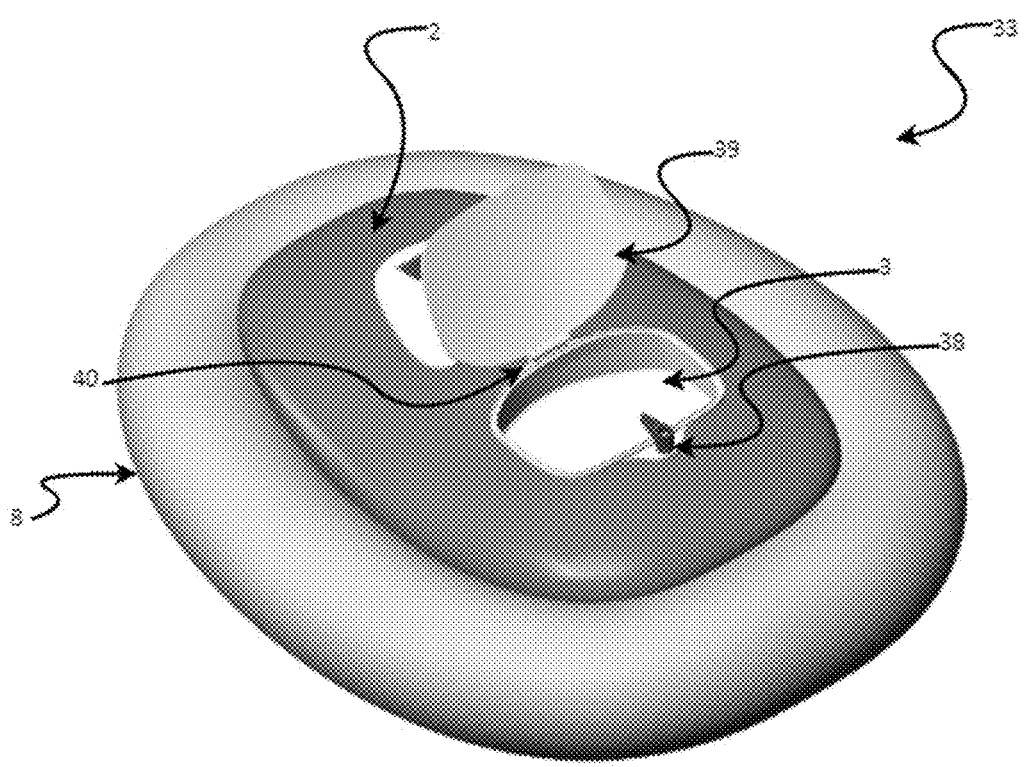
Figure 4: Watertight Storage Compartment

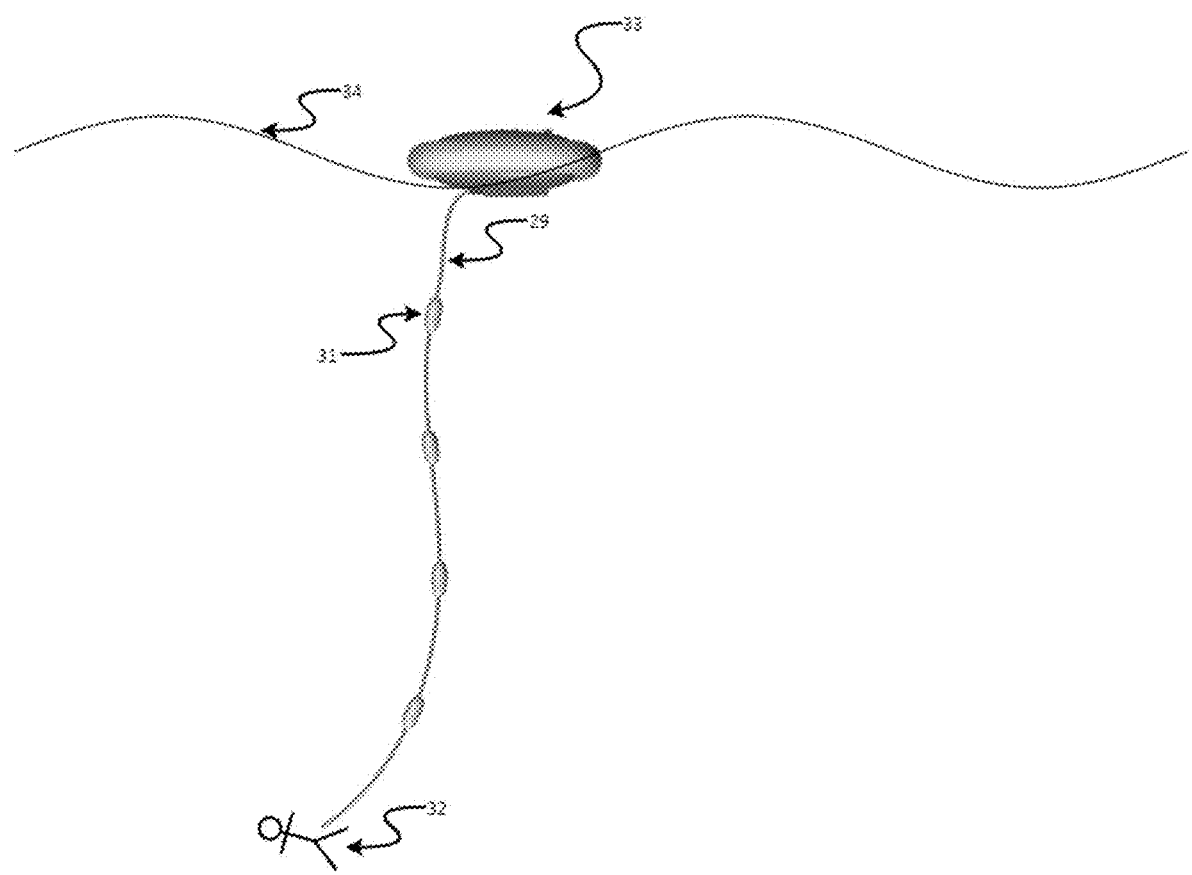
Figure 5: Air Delivery Hose with Data Recorder Sensors

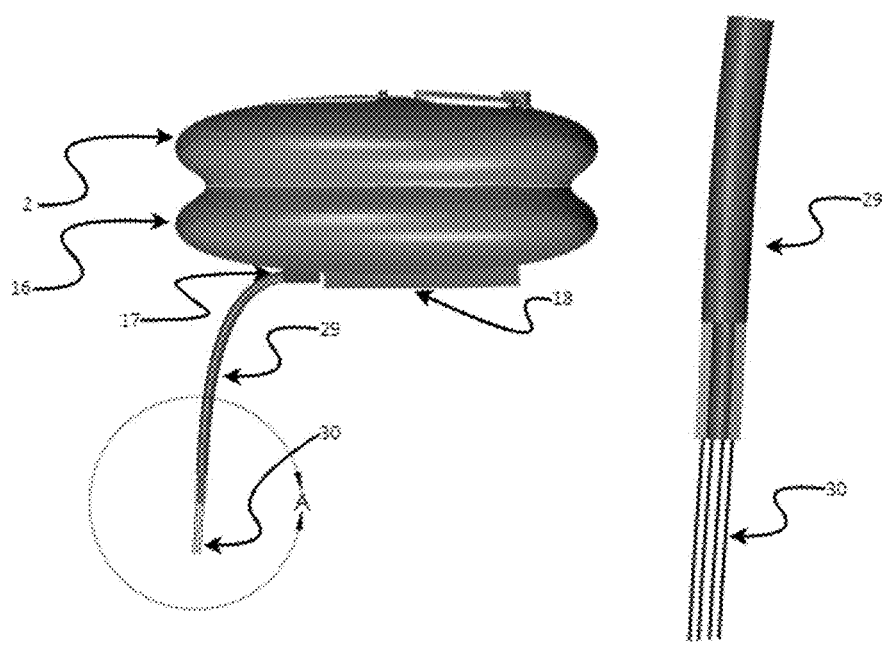
Figure 6: Air Delivery Hose Embedded Conductors

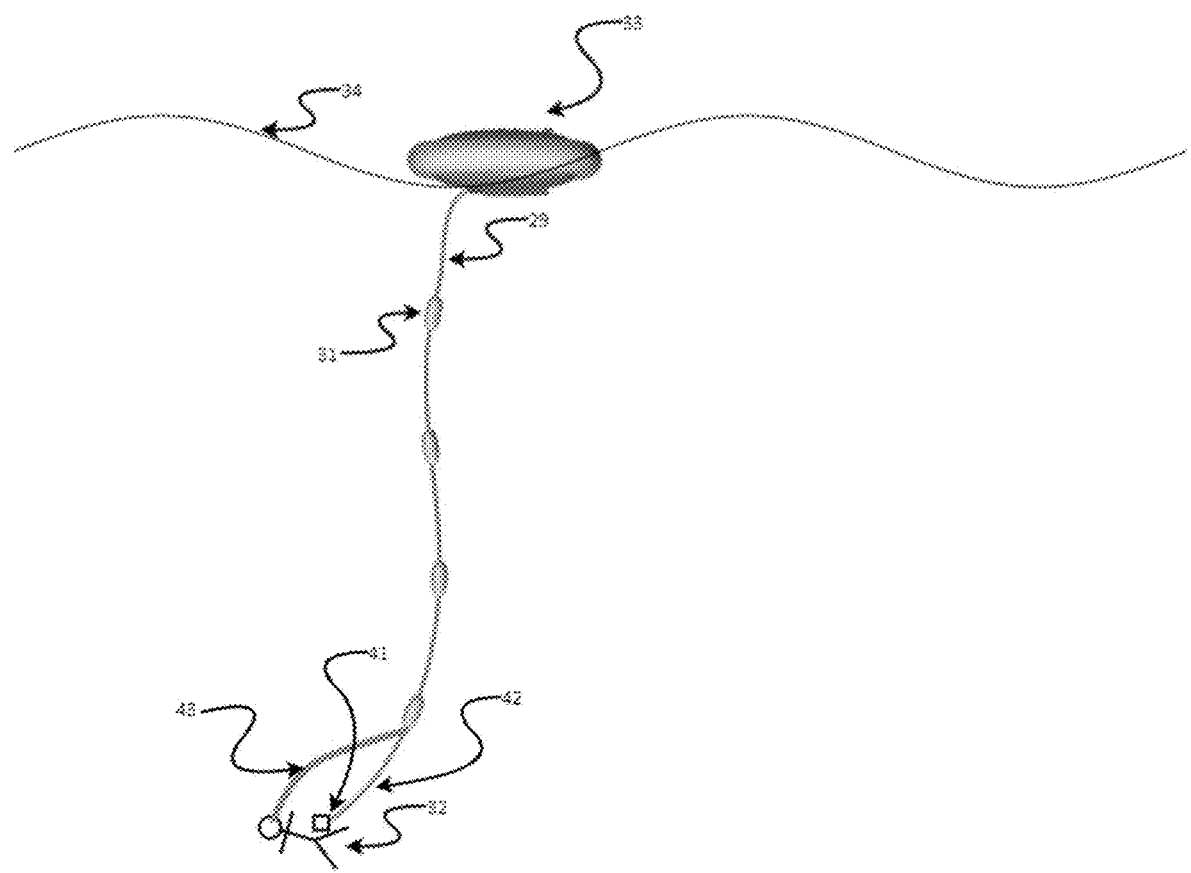
Figure 7: Air Delivery Hose with Wireless Receiver

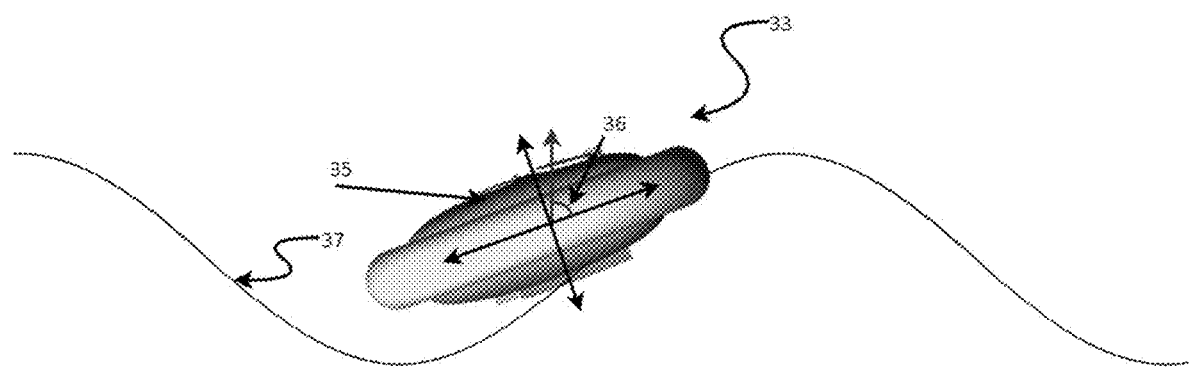
Figure 8: Flip Detection Sensor

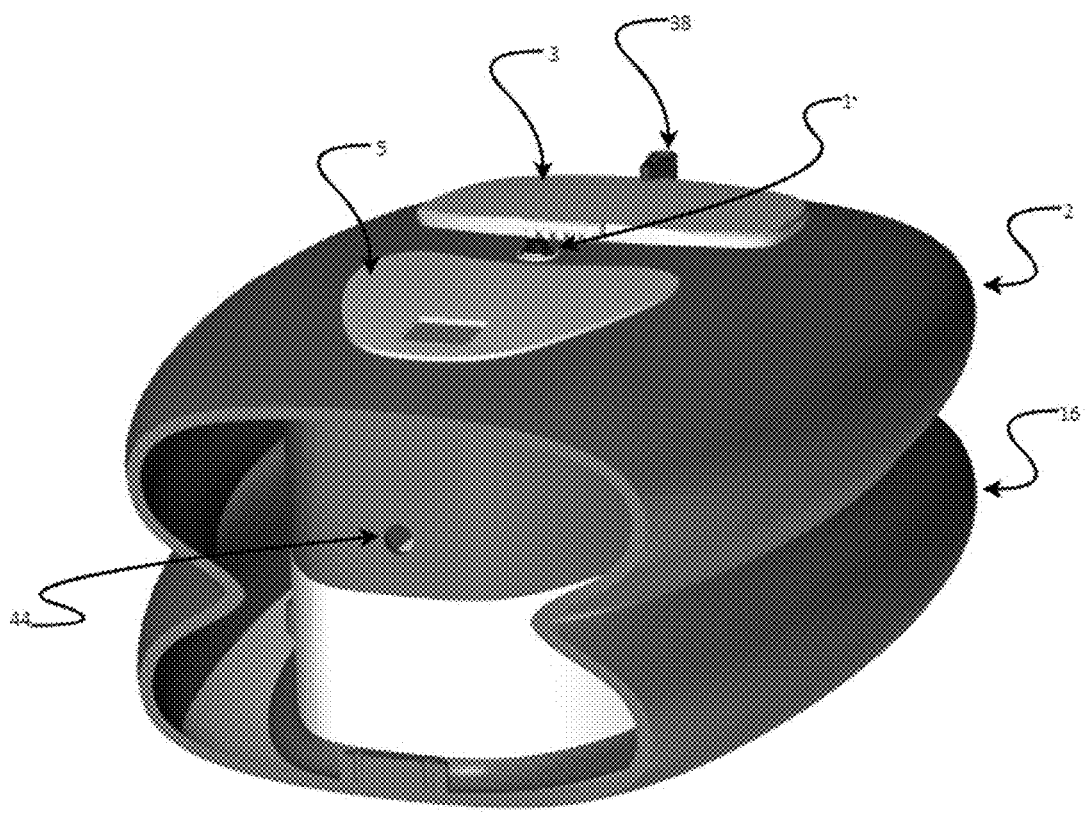
Figure 9: Air Intake Port

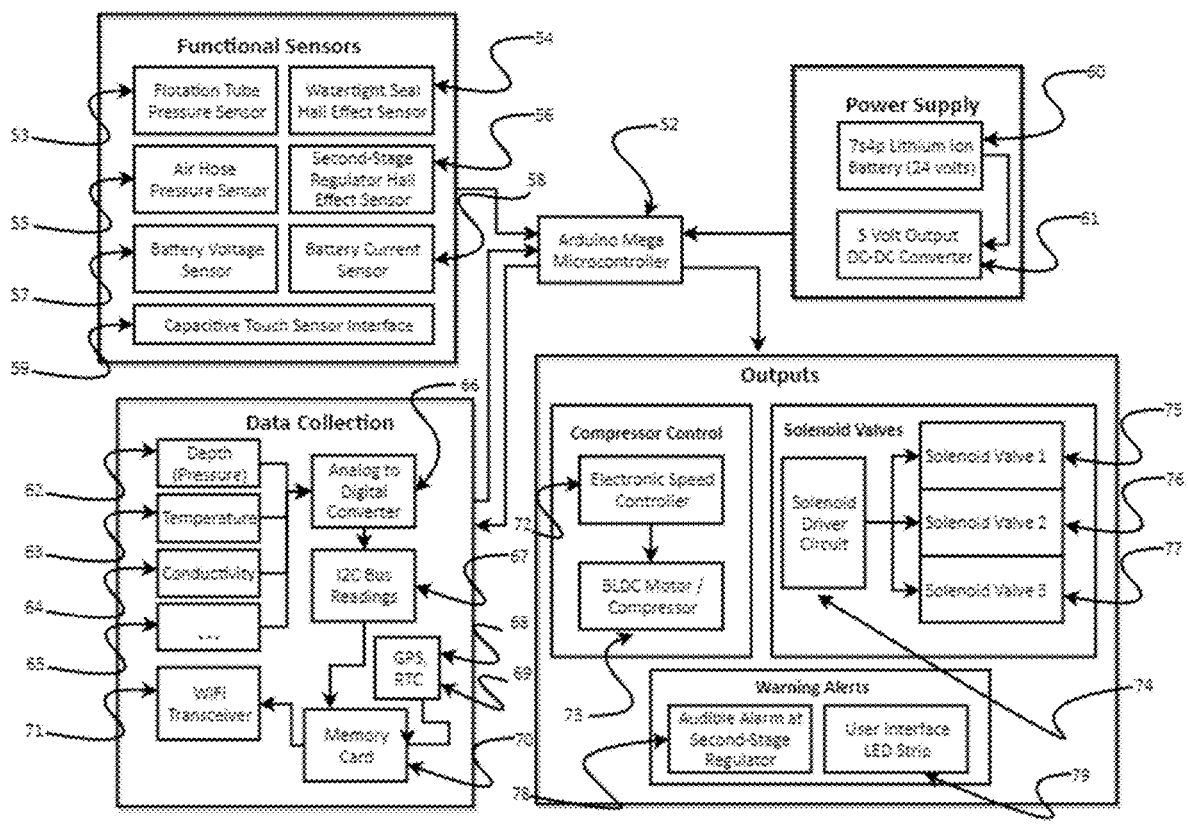
Figure 10: Microcontroller Inputs and Outputs

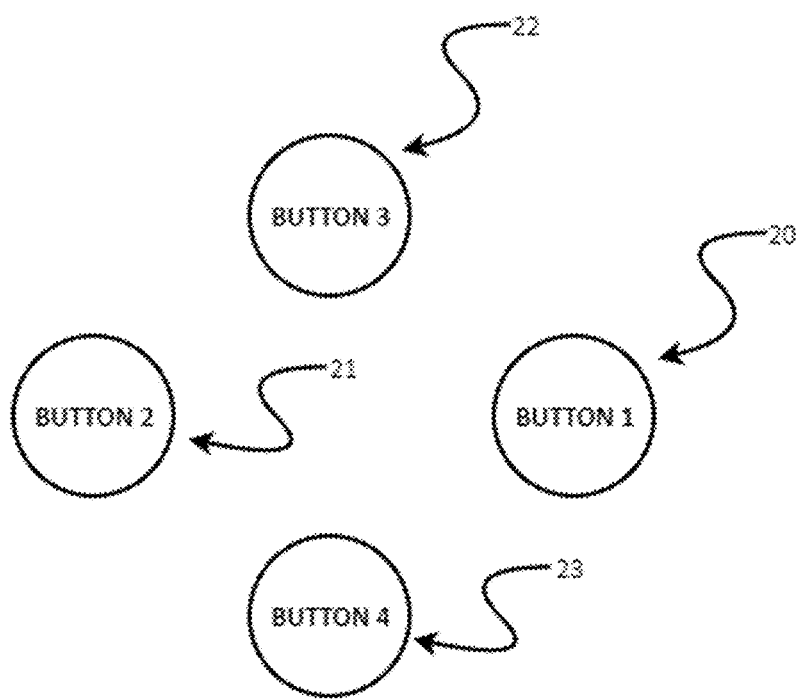
Figure 11: User Interface Button Layout

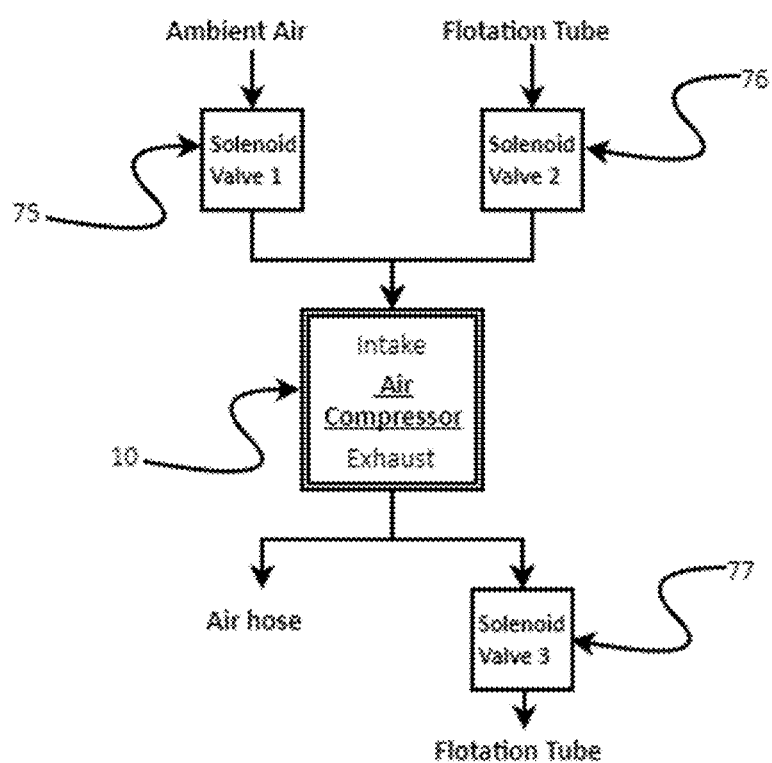
Figure 12: Solenoid Valve Layout

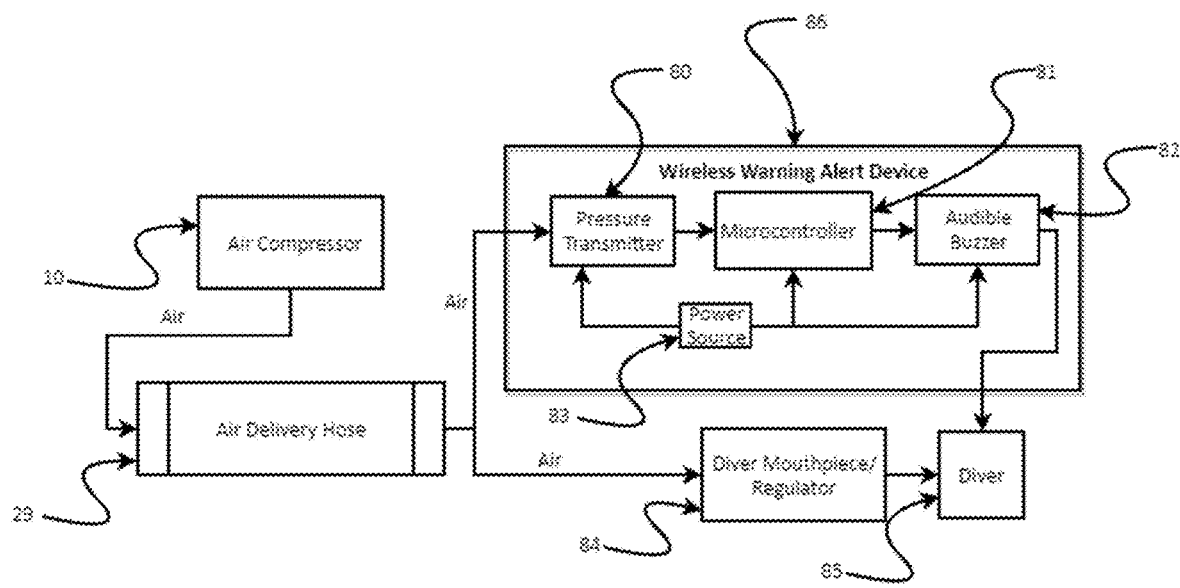
Figure 13: Wireless Warning Alert Device
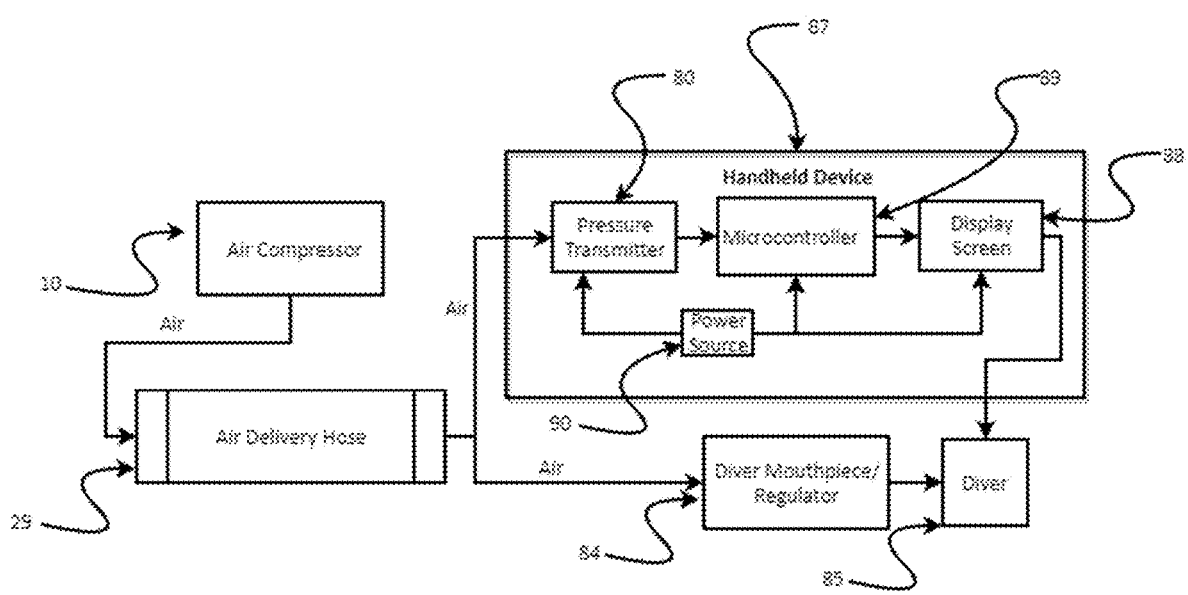
Figure 14: Pressure-based Underwater Wireless Communication Device

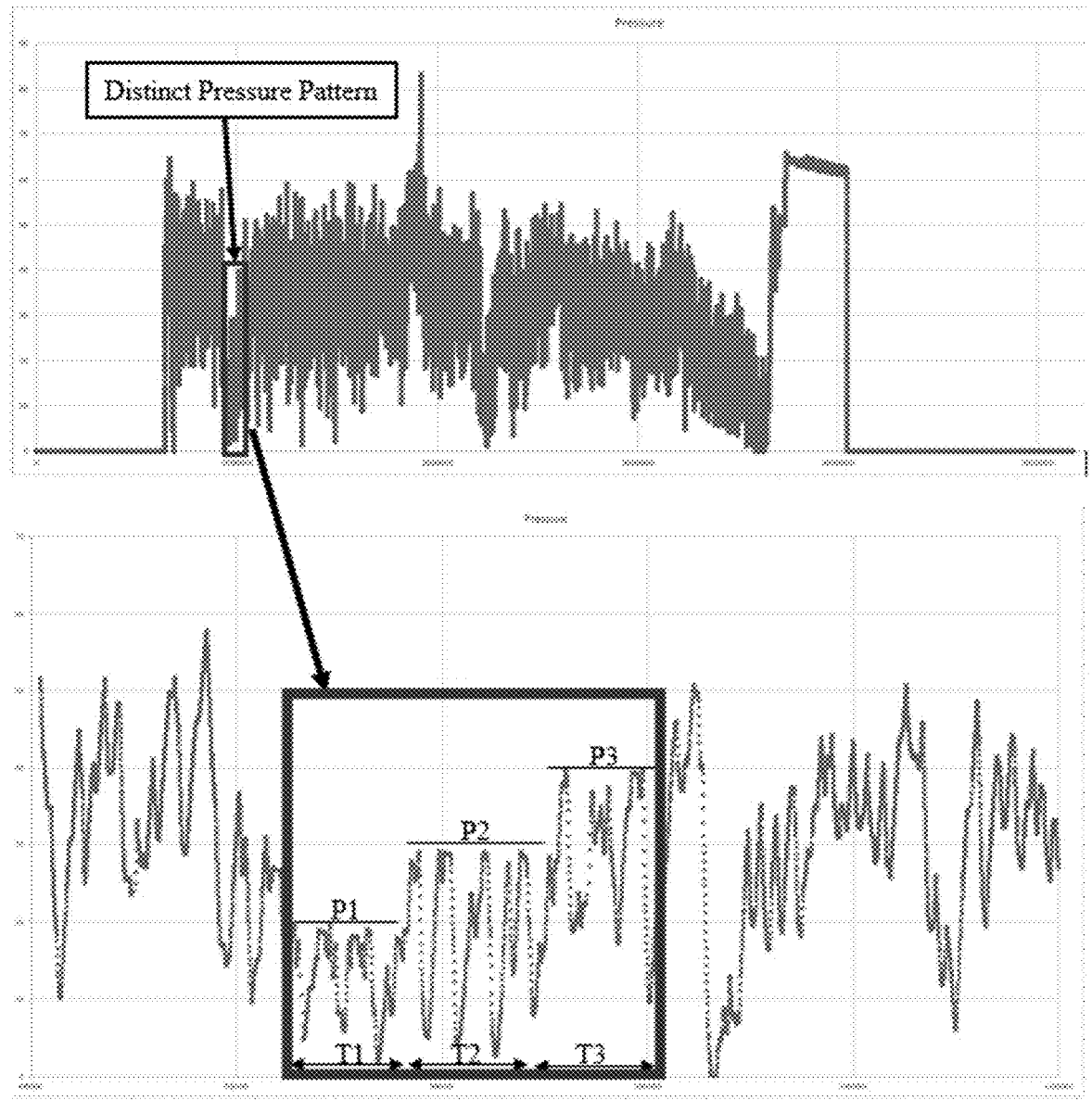
Figure 15: Pressure vs Time Graph of Pressure-based Underwater Wireless Communication Device from Test Dive

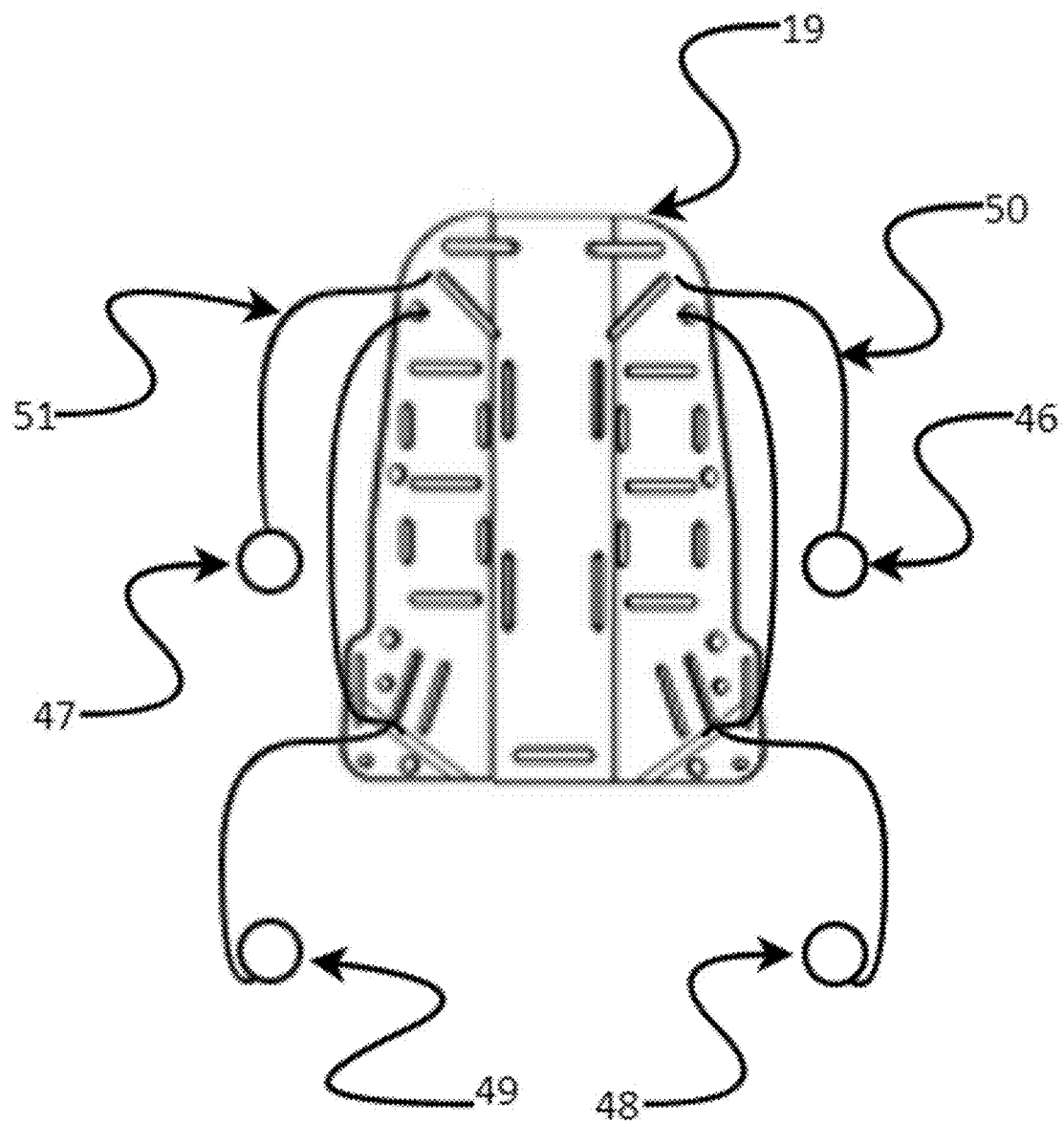
Figure 16: Diver Backplate Straps

AUTOMATED SELF-CONTAINED HOOKAH SYSTEM WITH UNOBSTRUSIVE AQUATIC DATA RECORDING

This application claims the benefit of and priority to U.S. Provisional Patent Application Ser. No. 62/657,840, filed Apr. 15, 2018, and U.S. Provisional Patent Application No. 62/594,940, filed Dec. 5, 2017. Both U.S. Provisional patent applications are incorporated by reference in their entireties for all purposes.

FIELD OF THE DISCLOSURE

The disclosure relates generally to underwater breathing apparatuses, and specifically to a self-contained surface supplied air system.

BACKGROUND

The surface supplied air system, also known as a hookah system, is an alternative to SCUBA diving, which requires the use of air tanks filled at high pressures of over 3000 psi. Surface supplied air systems operate at lower air pressures, typically under 100 psi. Hookah diving systems have traditionally been gasoline powered and too heavy, bulky, expensive, and difficult to use for a majority of people to choose hookah diving in favor of SCUBA diving. Surface supplied air is often used in industrial applications in which these factors are not of large concern, unlike the case of recreational diving applications.

One of the contributing factors to hookah systems being bulky is that the necessary gear for use of the system takes up enough space to require a full gear bag to be carried along with the hookah system itself. These items can include, but are not limited to, the following: flotation tube, air hose, diver mouthpiece/regulator, dive flag, diving harness, dive mask, dive fins, dive weight pockets. The flotation tube is required to keep the air compressor and other components floating on the surface while the diver is underwater. The flotation tube is also sometimes used as a utility for the divers when they are on the surface of the water, giving them something to hold onto while they rest, or store items such as weights. It also provides visibility on the surface, giving people a reference of where the divers are located and preventing boaters, kayakers, etc. from colliding with the hookah system. The air hose is required for transferring air from the surface to the diver. The diver mouthpiece/regulator is used by the diver to demand and stop air flow from coming out of the hose thereby conserving energy, opposed to previous free-flow air supply systems. The dive flag is required by law and is sometimes integrated with the air intake port to the air compressor. The diving harness is required for the diver to physically attach to the air hose, add optional dive weights for achieving neutral buoyancy, and attach other accessories such as a knife or underwater flashlight. Dive weight pockets are used to fill with weights to reduce the buoyancy of the diver. Weight pockets are typically filled with lead weights with a weight based on the diver's preference.

Another reason for the large size and weight of most hookah diving systems is that they have traditionally been built to support multiple divers to depths deeper than 40 feet of seawater. This is not always necessary for the user and can be scaled back to reduce size, weight, and cost. Also, bulky and heavy gasoline engines have been used predominantly in the past and are still used to a large degree. Otherwise, battery-powered hookah systems typically tend to use large and heavy battery technologies, like lead-acid, that are unlike lithium batteries. Lithium batteries are usually more expensive than other, heavier competing technologies. Another source of unnecessary weight is the choice to use brushed DC electric motors instead of brushless DC motors. Brushless DC motors are typically more expensive than brushed DC motors.

There are several types of compressor technologies that can be used in hookah systems. Different factors such as depth requirement, air-flow requirement, energy efficiency, size and other factors are considered when choosing the type of compressor.

One disadvantage of hookah diving in relation to SCUBA diving is the requirement for a flotation tube, although in most circumstances a floating dive flag is required while SCUBA diving. The flotation tube is deflated after each use to achieve the highest level of portability, and thus must be inflated prior to each dive. The inflation process has traditionally been a manual method of turning the compressor on, pushing a hose adapter into the flotation tube, waiting for the tube to fill up and then disconnecting the hose and turning off the compressor. This cuts into the setup time of the diver by requiring his or her attention while the tube is filling as to avoid overpressurizing the flotation tube. It also poses potential for user error in the way of not filling the tube with enough air or filling the tube with too much air. Filling the tube with too little air can cause the unit to submerge. Filling the tube with too much air can harm and potentially destroy the tube itself.

The health quality of aquatic environments around the world have been claimed by many to be in the act of a steep decline. There is an increasing awareness that large amounts of physical data are needed to establish a valid baseline of conditions so that future policy changes will be guided by factual public records in order to help slow or stop the decline in health of aquatic environments. One feasible way to collect such extensive amounts of data is to harness the existing work product of the millions of recreational and scientific divers around the world.

Typically, pH sensors are very large in size and require expert operation to minimize errors due to calibration drift of the sensor over time. Sensors that automatically calibrate are too large for most recreational applications.

A disadvantage of hookah systems with respect to SCUBA diving is that a hookah diver does not have knowledge of the remaining battery life of the system, in the case of battery-powered hookah systems, whereas a SCUBA diver can monitor a pressure gauge to determine when he or she is becoming low on air capacity. One past attempt to address this safety issue uses an audible piezoelectric alarm placed at the hookah system. However, this may be difficult to hear in certain situations and could be disrupting to marine life.

Hookah systems have always used air intake snorkels that sometimes double as a diver down flag. Intake snorkels were traditionally used to source air that is not contaminated by gasoline fumes. The snorkels also move the air intake away from water splashing into the intake. One problem with the snorkel intake is that if the system flips over in the water then the air intake will become full of water.

It is to overcoming or reducing the above problems with current hookah systems that the disclosed novel hookah system is directed.

BRIEF SUMMARY OF THE DISCLOSURE

Generally disclosed is a self-contained surface supplied air system preferably provided with backpack-wearable capability and automated setup functions for ease of use that is capable of recording valuable recreational and scientific data in an unobtrusive manner.

The novel system disclosed below introduces a way for users to eliminate the need to carry lead weights while transporting the system. As will be discussed in more detail below, novel small bags with a drawstring can be provided with the device/system that can be filled with sand or other materials or objects to replace lead weights. As a non-limiting example, a diver can fill the pocket with sand prior to the dive and empty it afterwards. Thus, the diver must only carry the pocket with him or her while transporting the device.

The below disclosed novel system can be applied to several devices that provide users with different maximum depth capabilities. Performance levels of different types of compressors at those maximum depths, paired with their feasibility in terms of cost, portability, energy usage, and other factors will determine which type of technology is applied to the device.

The flotation tube process can be automated to reduce setup time and electronically regulated to increase reliability and safety.

The below described system allows recreational divers or their inherent equipment to be capable of recording valuable and reputable data in a manner that does not involve extra effort by the user. A minimal effort required in obtaining the data recordings can ensure that high quantities of data are collected. Some of the most desired data parameters can include, but are not limited to: conductivity, temperature, depth, wave height, pH, light, turbidity, phosphorus, dissolved oxygen, nitrate levels, foreign substances, and acoustic readings.

The disclosed system can use a miniature pH sensor design with automatic calibration for integration into the data recording device. pH readings are essential to ocean acidification research, which is of large concern around the world.

The below described system can also locate an audible alarm closer to the diver.

The disclosed system can also improve the air intake method by utilizing a common area inside of the device that always has access to air, even if the system flips over in the water.

The disclosed embodiments for the novel system seek to capture the needs and interests of recreational divers by providing a system which is highly portable and easy to use. Disclosed is a novel hookah diving system comprising a portable body enclosing all necessary equipment and featuring automatic flotation tube inflation and deflation. The system can be provided with an integrated data recording device that collects physical data at points along the diver's tether from the surface all the way to the depth of the diver. The growing desire for scientific data collection in aquatic environments around the world is addressed with the data recording device in an unobtrusive manner, meaning that the data recorder does not require additional action by the user aside from the normal use of the hookah system and the operation of a mobile device application to upload data to an online database.

BRIEF DESCRIPTION OF THE DRAWINGS

FIG. 1 is an exploded view of most of the components for one non-limiting embodiment of the novel system in accordance with the present disclosure;

FIG. 2 (including FIG. 2.1, FIG. 2.2, FIG. 2.3, FIG. 2.4, FIG. 2.5 and FIG. 2.6) are several views of a non-limiting spring lift system in accordance with the present disclosure;

FIG. 3 (including FIG. 3.1 and FIG. 3.2) are views of the user interface panel in accordance with the present disclosure;

FIG. 4 is a perspective view of a watertight storage compartment in accordance with the present disclosure;

FIG. 5 is a perspective view of an air delivery hose underwater and having one or more data recorder sensors in accordance with the present disclosure;

FIG. 6 (include Detail A figure) illustrate the air delivery hose with embedded conductors in accordance with the present disclosure;

FIG. 7 illustrates the air delivery hose with a wireless receiver embodiment in accordance with the present disclosure;

FIG. 8 illustrates one non-limiting embodiment for the flip detection sensor in accordance with the present disclosure;

FIG. 9 illustrates one non-limiting embodiment for the novel air intake in accordance with the present disclosure;

FIG. 10 illustrates one non-limiting configuration for the microcontroller inputs and outputs in accordance with the present disclosure;

FIG. 11 illustrates one non-limiting configuration for the user interface button layout in accordance with the present disclosure;

FIG. 12 illustrates one non-limiting configuration for the solenoid valve layout in accordance with the present disclosure;

FIG. 13 illustrates one non-limiting configuration for a wireless warning alert device in accordance with the present disclosure;

FIG. 14 illustrates one non-limiting configuration for a pressure-based underwater wireless communication device in accordance with the present disclosure;

FIG. 15 illustrates an example Pressure v. Time graph in accordance with the present disclosure; and FIG. 16 illustrates a non-limiting backplate with straps that can be used with the system in accordance with the present disclosure.

DETAILED DESCRIPTION

FIG. 1 is an exploded view of most components for one embodiment of the disclosed novel system. A diver backplate (19) is shown with the diver backplate attachment block (18). A diver backplate attachment block (18) can be preferably permanently attached to a lower body (16). Diver backplate (19) can be attachable and removable from diver backplate attachment block (18). The diver backplate straps on backplate (19) can be used while carrying the system on the user's back for transportation of the unit. The diver backplate straps on diver backplate (19) can also be used by the diver as a harness to attach to an air delivery hose (29) while diving. There can be two configurations of the straps using buckles for each use of the diver backplate straps. An air delivery hose port (17) is the port for compressed air to exit the unit and can be attached to an air delivery hose (29). A lithium ion battery pack (12) can slide into lower body (16) and charges the electronics boards (27) via a wiring harness (28). A solenoid valve compartment (11) houses solenoid valves. A flotation tube (8) can be attached to the lower body (16) using flotation tube mounting tabs (9). An air compressor (10) can be attached to the lower body (16).

FIG. 2 shows the spring lift system which lifts upper body (2) up away from lower body (16). A spring lift pin (1) engages a spring lift pin socket (13) and a spring lift rail guide (14) engages a spring lift support truss (7). A spring lift gas spring (15) applies force upward so that when the button on spring lift pin (1) is pressed, spring lift gas springs (15) will lift upper body (2) of the unit away from lower body (16). FIGS. 2.1, 2.2, and 2.3 show the unit closed. FIGS. 2.4, 2.5, and 2.6 show the unit opened. Spring lift pin socket (13) is built with a base that keeps upper body (2) balanced. Spring lift support truss (7) applies equal force upward along upper body (2).

FIG. 3 shows a user interface panel (5) with the button layout showing the placement of User Interface Button 1 (20), User Interface Button 2 (21), User Interface Button 3 (22), and User Interface Button 4 (23) of a capacitive touch sensor board (26). A user interface display TFT module (25) can be visible through a user interface display glass panel (24). Electronics boards (27) can be stored inside a electronics housing (6). A wiring harness (28) connects the electronics in a electronics housing (6) to the components in a watertight storage compartment (3) and lower body (16).

FIG. 4 shows watertight storage compartment (3), including a watertight storage compartment lid (39), watertight storage compartment latch (38), and watertight storage compartment hinge (40). Watertight storage compartment (3) can have a groove along it for the watertight seal.

FIG. 5 shows air delivery hose (29) with several units of a data recorder sensor package (31) attached along the hose. A diver (32) breathes the air coming through the air delivery hose using a regulator. A system unit (33) floats on the surface of a body of water (34).

FIG. 6 shows the air delivery hose embedded conductors with detail. Air delivery hose (29) has data recorder sensor wires (30) running along the hose.

FIG. 7 shows air delivery hose 29 in configuration with a wireless receiver 41. Wireless receiver (41) receives air supply by being split in a y-configuration at the end of main air delivery hose (29). Air delivery hose 29 connection to a diver mouthpiece/regulator (43) feeds air to the diver. Air delivery hose 29 connection to wireless receiver (42) feeds air to wireless receiver (41).

FIG. 8 shows system unit in a wave on a surface of a body of water (37). A flip detection sensor (35) detects when a flip detection sensor angle (36) passes a certain value or threshold. At this point a warning signal can be issued.

FIG. 9 shows an air intake port (44) on the inside wall of upper body (2). Air intake port (44) can be placed inside so that water cannot infiltrate the intake port of the compressor at any time, even if the unit flips over in the water.

FIG. 10 shows a main microcontroller's (52) hardware inputs and outputs. The power supply can be, in one non-limiting embodiment, a 7s4p lithium ion battery (60) that can be converted down to 5 volts (61) for the microcontroller (52) and the sensors. In one non-limiting embodiment, the functional sensors can be comprised of a 0-5 psi pressure sensor (53) used for the automatic flotation tube inflation and deflation, a hall effect sensor (54) used for detecting if the lid of the unit is closed or open, a pressure sensor (55) for detecting the air pressure at the output of the air compressor (73) to the diver hose, a hall effect sensor (56) used for detecting when the user takes a breath on the regulator, a sensor for monitoring the battery voltage (57), a sensor for monitoring the battery current (58), and a capacitive touch sensor (59) used for the user interface. The data collection functionality can be comprised of array sensors (65) located at a multitude of locations along the diver hose, and each sensor output can be converted to a digital signal if it is not already a digital output. The digital signal will then be sent to an Inter-Integrated Circuit (I2C) bus, at which point it will be communicated to the microcontroller at the surface. The received data will be organized and stored into a memory card (70) in preparation to be sent via WiFi transceiver (71) to a mobile device. The outputs of microcontroller (52) can be comprised of the compressor control, the solenoid valves, and the warning alerts. The compressor control is achieved by communicating with the compressor's electronic speed controller (ESC) (72). The ESC receives signals from microcontroller (52) and applies the requested signals to the compressor's brushless DC motor (73). The solenoid valves are comprised of three two-port valves. Two of the valves are normally closed (NC) (76) (77) and one of the valves is normally open (NO) (75). A solenoid driver circuit (74) receives low voltage signals from microcontroller (52) and drives the solenoids at a higher voltage. The warning alerts can be comprised of an audible alarm (78) at the diver mouthpiece/regulator and an LED strip (79) on the user interface. LED strip (79) is signaled to change colors, such as to red (though not-limiting) when there is an error such as a low battery voltage. LED strip (79) also indicates to the user what mode the unit is currently operating in. Audible alarm (78) is signaled to turn on when there is an error such as low battery voltage, or if it has been detected that the system has flipped over, or other warnings. Flip detection is achieved through either the use of a tilt sensor or a gyroscope paired with accelerometer.

FIG. 11 shows a non-limiting preferred embodiment for a User Interface Button Layout, which can be driven by the capacitive touch sensors. Each of the buttons can be a capacitive touch sensor that recognizes a change in capacitance as a button press. In one non-limiting embodiment, button 1 (20) can be used for entering dive mode, at which point the compressor starts supplying air to the diver hose. Button 2 (21) can be used for stopping dive mode, at which point the compressor stops and the user interface returns to the main menu. Button 3 (22) can be used for inflating the tube. Holding Button 3 (22) and releasing starts the inflation. During the inflation, pressing any of the buttons preferably will stop the inflation. The user will have a period of time to continue inflation by pressing and holding any of the buttons. Inflation will stop when the button has been released. If inflation is not stopped by the user, then the tube will continue being inflated until the tube pressure sensor senses that the tube is fully inflated. Once it is fully inflated, the user will be given a period of time to continue inflation by pressing and holding any of the buttons. Inflation will stop when the button has been released.

FIG. 12 shows a non-limiting preferred embodiment for a solenoid valve layout. The solenoid valves are used to provide automatic flotation tube inflation and deflation functionality to the device. Under normal diving operation, in non-limiting configuration, Solenoid Valve 1 (75) is open and Solenoid Valve 2 (76) and Solenoid Valve 3 (77) are closed. This directs ambient air into the compressor and out to the air hose. During inflation of the flotation tube, Solenoid Valve 1 (75) is open, Solenoid Valve 2 (76) is closed, and Solenoid Valve 3 (77) is open, and the air hose is connected to the unit. This directs ambient air into the compressor and out to the air hose and to the flotation tube. Since the air hose and reservoir is a relatively small volume and the flotation tube is only brought up to a very low pressure, a solenoid valve between the exhaust and the air hose and reservoir preferably is not used. In some embodiments with a larger air reservoir, a solenoid valve between air hose and reservoir may be used. During deflation of the flotation tube, Solenoid Valve 1 (75) is closed, Solenoid Valve 2 (76) is open, Solenoid Valve 3 (77) is closed, and the air hose is disconnected from the unit using a quick-disconnect fitting, or the regulator is opened by pressing the purge button on the face of the regulator. This directs air from the flotation tube out to the ambient air. By requiring the user to disconnect the air hose or purge the regulator during deflation, the requirement of any additional solenoid valves can be avoided. If the hose and regulator are still connected during deflation, the user can control the compressor during deflation by using the regulator purge button. The tube will deflate while the regulator is being purged and stop when the regulator is connected and not being purged.

FIG. 13 shows a wireless warning alert device (86). Wireless warning alert device (86) is an alert system for the hookah diver that does not require wires to be connected from an audible buzzer (82) to main microcontroller (52) at the compressor system on the surface. The device cam be used in embodiments that do not have wires embedded into air delivery hose (29). Wireless warning alert device (86) can be connected in parallel with a diver mouthpiece/regulator (84) by splitting at the end of main air delivery hose (29). The device can also be embedded in main air delivery hose (29) or located inside of diver mouthpiece/regulator (84). The electronic components are stored inside of a waterproof housing. A pressure transmitter (80) detects the air pressure in an air delivery hose (29) and outputs a ratiometric analog value to a microcontroller (81). Microcontroller (81) analyzes the pressure readings, searching for a predetermined, distinct pressure pattern that is common to microcontroller (84) and microcontroller (52) on the surface unit. Microcontroller (52) on the surface unit controls the compressor to create a distinct pressure reading pattern in air delivery hose (29) once the battery voltage of the unit is below a certain threshold. The pressure pattern is recognized at wireless warning alert device (86) and microcontroller (81) then signals to turn on audible buzzer (82), which is sealed to the outside of the waterproof housing and able to be heard by the diver. Once the pressure pattern has been transmitted by the surface unit, it returns to normal operation. In some embodiments, audible buzzer (82) continues to alert the diver until it detects that buzzer (82) has been brought to the surface. This is accomplished by adding a depth sensor connected to the microcontroller inside of the waterproof housing. In some embodiments, the waterproof housing can feature a magnetic switch that the diver uses to turn the audible buzzer off once it has notified the diver.

FIG. 14 shows a Pressure-based Underwater Wireless Communication Device (87) that is utilized for sending data from the surface to the diver via air delivery hose (29) without wires. Data is sent using a novel form of wireless underwater communication discussed further below. The wireless communication device works similarly to Wireless Warning Alert Device (86) in that the transmitter, being microcontroller (52) and compressor unit on the surface, sends messages by varying the air pressure in air delivery hose (29). The receiver deciphers patterns to determine the message that is received. In Wireless Warning Alert Device (86) there is one distinct pattern and it is only used to activate audible buzzer (82). However, Pressure-based Underwater Wireless Communication Device (87) deciphers many patterns to receive more complex data messages. A display screen (88) shows the diver the messages being sent from the surface, whether it be person-to-person communication, GPS data, weather, or other data.

FIG. 15 shows a graph of air pressure in the hose on the y-axis and time elapsed on the x-axis using data recorded during a test dive on the prototype of the Pressure-based Underwater Wireless Communication Device. The top graph shows the pressure recordings throughout the entire dive. For testing purposes, the pattern signal was programmed to be transmitted five minutes into the dive. In the case of the audible buzzer alarm, the pattern signal would be transmitted when the voltage of the battery drops below a certain level or another warning is detected that needs to be transmitted to the diver. The bottom graph zooms into the red area of the top graph to show the presence of the distinct pressure pattern. The pressure limits are labeled as P1, P2, and P3. The time periods of these pressure limits are labeled as T1, T2, and T3, respectively. The microcontroller in the receiver device recognizes these patterns and deciphers them.

FIG. 16 shows the diver backplate straps on diver backplate (19). A left strap (50) has a female buckle for a left top buckle (46) and a male buckle for a left bottom buckle (48). A right strap (51) has a male buckle for a right top buckle (47) and a female buckle for a right bottom buckle (49). Left top buckle (46) connects to left bottom buckle (48) and right top buckle (47) connects to right bottom buckle (49) during backpack operation. Left bottom buckle (48) connects to right bottom buckle (49) during diving operation.

Equipment that can be enclosed in the body of the system, can include, but is not limited to, the following: flotation tube, air hose, diver mouthpiece/regulator, dive flag, diving harness. In one non-limiting embodiment for the disclosed system, some gear may require an individual transportation method that is separate from the main unit, such as a gear bag, to avoid excessive weight being carried by a single person or body part.

The flotation tube is stored inside of the unit during transportation and can be accessed by opening the lid of the unit. Opening the lid can be accomplished with a button-activated lift system that utilizes gas springs. The flotation tube can be pulled out of the unit and the lid is then closed to achieve a watertight seal during diving operation. In one non-limiting embodiment, a magnet and hall effect sensor can be utilized to detect that the watertight seal is achieved prior to entering dive mode.

The air hose is stowed by wrapping it around the outer shell of the body when the lid is closed. A hose clip near the diver mouthpiece/regulator keeps the hose coiled up during transportation. The diver mouthpiece/regulator can be connected to the end of the air hose but can be disconnected for maintenance if necessary.

The user's dive flag can be snapped in place on a clip mounted on the system.

In one non-limiting embodiment, the system's frame can be designed to be attachable to a diving harness backplate, giving the user the ability to wear the package on his or her back without the use of additional equipment.

Ease use of the hookah system is increased with automatic inflation and deflation of the flotation tube. This is achieved using digitally activated solenoid valves that are inline with the intake and exhaust of the air compressor. During inflation of the tube, the solenoids are activated such that the compressor intakes air from the surrounding environment and directs it into both the air hose and the flotation tube. An accurate and precise low-pressure pressure sensor sends an analog input to the microcontroller while the tube is inflating. Once the tube has been fully inflated, the compressor is signaled to stop. The user is then given the option to continue filling the tube by holding a touch button and releasing when the user wishes to stop. The opposite is done in the case of deflating the tube, with the solenoids activated such that the compressor intakes air from the flotation tube and exhausts it into the surrounding environment. During dive mode, the solenoids are controlled such that the compressor intakes air from the surrounding environment and exhausts compressed air only to the diver's air hose.

The data recorder operates unobtrusively while the user is diving. A memory card begins collecting data points from the GPS, clock, and all of the sensors when the user has selected to enter dive mode. The physical parameters collected by the device can include, but are not limited to, the following: conductivity, temperature, depth, wave height, pH, light. The sensors for each of these parameters are embedded into or on the surface of the air hose such that the data is collected at a continuous column of depths extending from the surface to the depth of the diver.

Sensors may be integrated along the air hose in a permanent or temporary fashion. In the case of attachable sensors, the sensors may attach via hardware connectors or through the use of wireless near-field communication or other radio frequency communication protocols. The wave height is recorded by a sensor installed in the surface unit.

The sensor-embedded tether can be used in the case of a SCUBA diver or freediving diver as well. In the case of a SCUBA diver, the sensor tether is embedded into or on the surface of the surface marker float tether. Traditional data collection devices record data points at discrete depths. Each of the sensors may be supplied with 5 volts DC from a power supply on board the floating system and communicates with the microcontroller. The communication may be achieved via I2C protocol, which allows for a maximum of 1008 devices to communicate using only two wires, or other protocol. The sensor packages may be battery-powered and not receive power from the surface system. The sensor packages may be completely removable and wirelessly communicate with the surface system.

The sensor packages that are attached to the air delivery hose can contain a ranging set of sensors and devices. The packages can have a consistent communication protocol and can be expanded upon in an open-source manner. Some packages may contain more sensors than others. Users have the ability to add more sensors and develop the packages and all configurations are considered within the scope of the disclosure.

After the dive, the data recorder communicates via WiFi with a mobile application that combines the timestamped GPS coordinates with timestamped physical data. The user has the option to further combine these data points with the user's timestamped photos or videos from the dive. The data can be uploaded to a publicly accessible online database or another database when an internet connection is present.

In some embodiments, scroll compressor technology is preferred over the use of reciprocating machines and other types of compressor technologies. Scroll compressors are suited better for variable-speed applications as the required startup power and power loss during speed changes is less than other technologies. Also, scroll compressors comprise of fewer moving parts than reciprocating machines and therefore can be assumed a more reliable machine in saltwater environments. According to Air Squared, scroll compressors have "70% fewer moving parts than reciprocating technology" with "only two primary moving parts." This also makes the compressors more serviceable. The "quiet, smooth, pulsation-free operation" claimed by Air Squared is also desirable for a number of reasons. It is less quiet and thus more peaceful than a reciprocating pump. Scroll compressors exist in an oil-free, breathing air configuration. The combination of the scroll compressor with a variable-speed algorithm that detects the breathing pattern of the diver and adjusts the air supply to the diver's demand yields a highly energy efficient hookah system. A highly energy efficient hookah system has the capability of providing the diver with longer dive run times and lighter weight configurations. The scroll compressor is paired with a brushless DC motor that is lightweight compared to brushed DC motors. The scroll compressor also has the advantage over the reciprocating pump in that more precise pressure limits can be achieved. This is beneficial in performing wireless communications as will be discussed. Scroll compressors can be lighter than reciprocating compressors.

The breathing pattern detection algorithm mentioned in the prior paragraph is a way to mitigate delay times between the diver's demand for air and the compressor's supply of air. In current variable-speed hookah systems, there is a direct inverse relationship between the pressure in the hose and the speed of the compressor. As the pressure in the hose decreases, the speed of the compressor increases. The novel breathing pattern detection algorithm reduces the delay by anticipating the moment that a diver will begin to breathe. This is achieved by continuously updating the breathing pattern, which can be done by measuring the time between breaths and updating an average time between breaths. The average is more heavily weighted with those breaths that were taken a shorter time previous to the present so that the algorithm can update the breathing pattern rapidly. This would be useful when the breathing pattern of the diver changes rapidly from slow breathing to quick breathing or vis versa.

An air reservoir can be provided so that the diver always has a sufficient air supply to breathe from. The air reservoir should be large enough to supply multiple breaths of air to the diver. The volumetric flow rate supplied by the compressor may not always be sufficient for the diver's single breaths, but over a longer period of time the compressor can supply more than the average amount of air required by the diver. An air reservoir in between the compressor and the diver is used to account for the demand of the diver instantaneously. The compressor then fills the air reservoir back up until the pressure has hit the designated pressure limit. In some embodiments, this air reservoir can be a small air tank. In some embodiments, this air reservoir can be an enclosed area inside of the unit. In some embodiments, this air reservoir can reside in the air delivery hose. The air delivery hose should have a sufficient length and inside diameter to provide enough volume for the reservoir. In some embodiments, an expanding hose can be used. An expanding hose allows for the hose to be compact and portable while also providing sufficient reservoir volume. As the pressure in the hose increases, the volume of the hose increases until it reaches its limit. When the pressure in the hose decreases, the volume of the hose decreases accordingly. The hose is smaller in length and in diameter when there is less air pressure. This allows the hose to still be coiled around the outside of the shell of the system, but also provide a significant air reservoir volume.

The air intake of the disclosed novel system is different than similar inventions. A common area inside of the shell of the unit that the intake of the compressor is connected with can be provided. Air from outside the unit does not enter this area through an intake snorkel. Air preferably enters this area around the centerline of the unit, where the flotation tube is extracted from. Air enters at the centerline below and above the flotation tube. In the event that the system flips over in the water, the intake of the compressor will not be subject to water intrusion. Air will continue to enter the common area inside the shell of the unit. An intake port from the inner wall of the unit will connect the compressor to the outer area where the common ambient air resides. In traditional hookah systems, a snorkel points up vertically to intake air for the compressor. The disclosed novel system may or may not include this snorkel.

All hookah diving systems have preset pressure limits and speed control characteristics for their compressors. Pressure limits are decided based on the depth of the water that the diver is descending to and also the air reservoir capacity. The deeper that the diver descends, the higher the pressure in the hose must be for the air to continue flowing to the diver's depth. At 33 feet of depth, or 1 atmosphere, the air hose must be filled to at least 14.7 psi for the air to be able to flow to the diver. Air reservoir capacity is another consideration. By filling the air reservoir to a higher pressure, more air is stored in the same volume as a reservoir supply. There are drawbacks to working at higher pressures, though. Higher pressures result in higher torques on the compressor and therefore more power required by the compressor. This reduces the energy efficiency of the hookah system and reduces the run time capability. In some embodiments, the present invention overcomes this problem by providing the user with the ability to adjust the pressure limits by inputting the maximum depth that the diver will descend to. A shallower maximum depth allows for the compressors to work within lower pressure limits and therefore save energy. In other embodiments, the depth of the diver is detected by an ambient pressure sensor located at the diver and the compressor can be automatically controlled with respect to the continuously updating real-time depth of the diver.

The diver is notified of warnings such as low-battery using an audible alarm which is placed inside of the diver mouthpiece/regulator. In one embodiment, the alarm can be powered and controlled from the microcontroller via wires that are embedded into the air hose.

In some embodiments, the alarm receives signals wirelessly from the microcontroller using a novel form of underwater communication. The air pressure in the hose is controlled by the microcontroller running the compressor. When the battery voltage is detected as being low, the usual inverse relationship between speed and pressure for the compressor control can be overridden with a compressor control routine that creates a distinct pattern in pressure readings in the air delivery hose. A separate device, meaning there are no wires between the two, is located at the end of the delivery hose opposite of the compressor. This device is equipped with a pressure transmitter, microcontroller, and audible buzzer. The microcontroller is constantly monitoring the pressure readings in the hose and comparing the readings with a predetermined, distinct pattern. If the pattern has been detected, the microcontroller signals the audible buzzer to be turned on. This alerts the diver that the battery is reaching an unsafe low voltage. Once the pattern has been sent by the compressor unit, the compressor control returns to its normal operation. This embodiment can be used in devices that do not have wires embedded into the air delivery hose.

The novel form of wireless communication discussed in the prior paragraph can be utilized for additional applications other than warning signals. Other applications may include, but are not limited to: weather, GPS, person-to-person communication, photos, videos. This form of communication is based on varying the air pressure in the hose tether to send a message. The main factor in creating a distinct message in the pressure readings is the changing of the set point for the maximum pressure limit of the air pressure in the hose. In the case of the audible buzzer alarm, the message enclosed is a distinct pattern of pressure values for certain periods of time. There are a number of maximum pressure limit set points that exist for exact periods of time. For example, one pattern may be to set the pressure limit at 30 psi for 10 seconds, 20 psi for 5 seconds, and 25 psi for 10 seconds. The detection of this pattern at the diver's device completes the message delivery. The protocol can be modified to send messages that contain greater amounts of data. The major benefit of this communication method is that wires are not necessary along the tether. A major application for this form of communication may be underwater navigation. Since GPS signals do not travel through water, underwater diver navigation systems are not a prevalent technology. Expensive underwater wireless communication devices are required to communicate GPS signals from the surface to a diver underwater.

The variable-speed compressor is signaled to run according to the pressure. As the pressure drops, the compressor will run faster to pump more air, to a certain degree. Once the hose has reached a certain air pressure, the compressor can shut off.

The unit can include a watertight storage box that allows the user to store personal items such as a mobile device, wallet, keys, or other items during the dive or during transportation of the unit. Inside of the storage box can be two USB charging ports (or another number o ports) that may be used to charge a mobile device, camera, or other device. The storage box gives the user the capability to bring valuable items with him or her during the dive so that the user does not have to return to the start location of the dive to retrieve these items.

Inside of the storage box is where the power switch for the unit can be located. It is also where the charging port for the battery of the unit can be located. The charging port is a panel-mounted barrel connector. The battery can be charged while it is installed in the unit or while it is disconnected from the unit. The battery can be swapped by removing the lid of the unit. This is accomplished by first using the button-activated lift system to lift the lid up, breaking the watertight seal. Then, by holding the button and pulling up on the lid it can be removed and set aside from the rest of the unit. At this point, the battery is accessible and can be removed by pulling it out of its adapter. A spare battery can be directly inserted.

The user interface of the disclosed system preferably utilizes a capacitive touch sensing technology. The technology is smooth and reliable and has the capability to filter out the presence of water droplets. In one embodiment, there are four buttons that control the operation of the unit (though other number of buttons can be used and are considered within the scope of the disclosure). A preferred, non-limiting button layout embodiment is shown in FIG. 10. The four functions can include dive mode, tube inflation, tube deflation, and stop. Tube inflation is initiated by pressing and holding Button 3 for one second, then letting go. The tube will inflate until the pressure sensor detects that it is full. The user is given three seconds after this during which the user can press and hold any button to continue inflating the tube. The tube will inflate for as long as the user is holding the button. The same process endures for deflation, but with Button 4. Dive mode is entered by pressing Button 1. While in dive mode, the user can exit dive mode by pressing Button 2. Other functions, time periods and/or configurations can be used and are considered within the scope of the disclosure.

A passcode can be implemented by the user if desired. This passcode can be configured in the mobile application of the device. With the passcode activated, the buttons will not have any use until the user presses a certain pattern as chosen. As a non-limiting example, a passcode can be chosen as follows: Button 1, Button 2, Button 1. Other passcodes can also be used and all are considered within the scope of the disclosure. At this point the unit will be unlocked and functions can be enabled. After a configurable amount of time without any activity, the user interface will be locked again. The passcode can be helpful in preventing water or other foreign objects from controlling the system. It can also help prevent unwanted people from controlling the system.

A mobile device application can be used to change settings on the hookah system. The user can change the depth limit, or pressure limit. The user can alter the speed limit as well. These settings can be used to improve energy efficiency. More experienced divers may not require as much air-flow and can then fine tune their settings to achieve longer run times. The mobile application can also be used to change the passcode of the device. The mobile application can be used to interact on social media to find dive sites and post GPS dive tracks with photos, videos, and data to social media platforms, in addition to the online database.

Carry handles can be located on the flotation tube so that the user can carry the unit into the water once the flotation tube has been inflated. There can also be carry handles attached to the bottom half of the shell of the unit. These handles are used for transportation of the unit when the backplate attachment is not desired. The user can carry the unit with one or two hands.

The diver backplate can also be used as a backpack for transporting the system. The backplate attaches and removes from the diver backplate mounting attachment block. The straps on the diver backplate use adjustable stealth buckles. The straps are configured differently when wearing the unit on the back than when using the diver backplate as a harness for diving. There is a male adjustable stealth buckle at the top of one strap and there is a female adjustable stealth buckle at the top of the opposing strap. At the bottom of the strap with the male adjustable stealth buckle there is a female adjustable stealth buckle. At the bottom of the strap with the female adjustable stealth buckle there is a male adjustable stealth buckle. When the user is transporting the unit on their back, the bottom buckle on each side is connected to the top buckle so that the backplate can be pulled tight to the user's back. When the user is diving with the diver backplate as a dive harness, the bottom buckles are connected together to provide support around the waist for towing of the surface system. Other buckle configurations can be used and are also considered within the scope of the disclosure.

Below is a non-limiting listing of the various reference numerals assigned to the parts of the system and used in the below Detailed Description:

1. Spring Lift Pin
2. Upper Body
3. Watertight Storage Compartment
4. User Interface Display
5. User Interface Panel
6. Electronics Housing
7. Spring Lift Support Truss
8. Flotation Tube
9. Flotation Tube Mounting Tab
10. Air Compressor
11. Solenoid Valve Compartment
12. Lithium Ion Battery Pack
13. Spring Lift Pin Socket
14. Spring Lift Rail Guide
15. Spring Lift Gas Spring
16. Lower Body
17. Air Delivery Hose Port
18. Diver Backplate Attachment Block
19. Diver Backplate
20. User Interface Button 1
21. User Interface Button 2
22. User Interface Button 3
23. User Interface Button 4
24. User Interface Display Glass Panel
25. User Interface Display TFT Module
26. Capacitive Touch Sensor Board
27. Electronics Boards
28. Wiring Harness
29. Air Delivery Hose
30. Data Recorder Sensor Wires
31. Data Recorder Sensor Package
32. Diver
33. System Unit
34. Surface of the Water
35. Flip Detection Sensor
36. Flip Detection Sensor Angle
37. Wave on Surface of the Water
38. Watertight Storage Compartment Latch
39. Watertight Storage Compartment Lid
40. Watertight Storage Compartment Hinge
41. Wireless Receiver
42. Air Delivery Hose Connection to Wireless Receiver
43. Air Delivery Hose Connection to Diver Mouthpiece/Regulator
44. Air Intake Port
45. Diver Backplate Straps
46. Left Top Buckle
47. Right Top Buckle
48. Left Bottom Buckle
49. Right Bottom Buckle
50. Left Strap
51. Right Strap
52. Microcontroller
53. Flotation Tube Pressure Sensor
54. Watertight Seal Hall Effect Sensor
55. Air Hose Pressure Sensor
56. Second-Stage Regulator Hall Effect Sensor
57. Battery Voltage Sensor
58. Battery Current Sensor
59. Capacitive Touch Sensor Interface
60. Lithium Ion Battery Pack
61. 5 Volt Output DC-DC Converter
62. Depth Sensor
63. Temperature Sensor
64. Conductivity Sensor
65. Modular Sensor Connection
66. Data Collection Analog to Digital Converter
67. Data Collection I2C Bus
68. Geographic Positioning System Antenna
69. Real Time Clock
70. Memory Card
71. WiFi Transceiver
72. Electronic Speed Controller
73. BLDC Motor/Compressor
74. Solenoid Valve Driver Circuit
75. Solenoid Valve 1
76. Solenoid Valve 2
77. Solenoid Valve 3
78. Audible Alarm
79. User Interface LED Mode Indicator 80. Pressure Transmitter
81. Wireless Warning Alert Device Microcontroller
82. Audible Buzzer
83. Wireless Warning Alert Device Power Source
84. Diver Mouthpiece/Regulator
85. Diver
86. Wireless Warning Alert Device
87. Pressure-based Underwater Wireless Communication Device
88. Pressure-based Underwater Wireless Communication Device Display Screen
89. Pressure-based Underwater Wireless Communication Device Microcontroller
90. Pressure-based Underwater Wireless Communication Device Power Source It should be understood that the exemplary embodiments described herein should be considered in a descriptive sense only and not for purposes of limitation. Where multiple embodiments are disclosed, descriptions of features or aspects within each embodiment should typically be considered as available for other similar features or aspects in other embodiments. While one or more embodiments have been described with reference to the figures, it is understood that various changes in form and details may be made therein without departing from their spirit and scope and such changes are considered within the scope of the disclosure.

All parts/components of the novel hookah system and their locations, wiring, solar powering means, mechanical and/or electrical communications between parts/components, attachment or securement mechanisms, dimensions, values, shapes, materials, data storage, storage, uses, etc. discussed above or shown in the figures, if any, are merely by way of example and are not considered limiting and other component(s) and their locations, wiring, solar powering means, mechanical and electrical communications between parts/components, attachment or securement mechanisms, dimensions, values, shapes, materials, data storage, storage, uses, etc. can be chosen and used and all are considered within the scope of the disclosure.

The benefits, advantages, solutions to problems, and any element(s) that may cause any benefit, advantage, or solution to occur or become more pronounced are not to be construed as a critical, required, or essential features or elements of any or all the future claims.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the novel hookah system has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. A data collection system for unobtrusively collecting underwater environmental health data while a diver is underwater diving in conjunction with a self-contained surface supplied air system, the self-contained surface supplied air system having a floatable body member, an air compressor disposed within the floatable body member and an air hose running from the air compressor at a water surface down to the diver while the diver is underwater, the air hose having a first end associated with the air compressor and a second end associated with the diver, the system comprising:
   a plurality of sensors attached to the air hose while the air hose is underwater, each sensor of the plurality of sensors embedded or integrated into a surface area of the air hose at various different depth levels along the air hose to allow data to be collected by the plurality of sensors at a column of depths extending from the water surface to a depth of the diver; the plurality of sensors comprising a data recorder sensor automatically calibrated for integration into a data recording device, the data recording device receiving the environmental health data at points along the air hose without any additional action by the diver aside from normal use of the self-contained surface supplied air system;
   a microcontroller disposed within the floatable body member, the plurality of sensors in electronic communication with the microcontroller, the microcontroller is programmed to receive the data from the plurality of sensors for further processing;
   wherein the second end of the air hose is split into two separate air travel passageways with a first passageway adapted for connection to a diver mouthpiece/regulator and a second passageway adapted for connection to a wireless receiver or handheld device;
   wherein the microcontroller is programmed to send messages by causing the compressor to vary the air pressure in the air hose and the wireless receiver is programmed to decipher an air pressure pattern for determining a warning or alert subject matter associated with the air pressure pattern.

2. The data collection system of claim 1 wherein the data recorder sensor obtaining pH readings which are transmitted to the microcontroller.

3. The data collection system of claim 1 further comprising storage memory in communication with the microcontroller; wherein data sent from the plurality of sensors to the microcontroller is stored in the storage memory by the microcontroller.

4. The data collection system of claim 3 wherein the storage memory is a memory card.

5. The data collection system of claim 4 wherein the memory card collects data points from GPS, a clock and the plurality of sensors.

6. The data collection system of claim 1 wherein the plurality of sensors are in wireless communication with the microcontroller.

7. The data collection system of claim 1 further comprising data recorder sensor wires in communication with the data recorder sensor and disposed within the air hose and running along the air hose to the surface.

8. The data collection system of claim 1 further comprising a software application running on a mobile device use for uploading the received data to an online database.

9. The data collection system of claim 1 wherein the wireless receiver is a wireless warning alert device adapted to be connected in parallel with the diver mouthpiece/regulator.

10. The data collection system of claim 1 wherein the air hose is adapted for wrapping around the body member when not in operation.

11. The data collection system of claim 1 wherein one or more physical parameters from a group consisting of conductivity, temperature, depth, wave height, pH and light are collected from the plurality of sensors.

12. The data collection system of claim 1 further comprising a software application running on a mobile device use for combining timestamped GPS coordinates with timestamped physical data.

13. A data collection system for unobtrusively collecting underwater environmental health data while a diver is underwater diving in conjunction with a self-contained surface supplied air system, the self-contained surface supplied air system having a floatable body member, an air compressor disposed within the floatable body member and an air hose running from the air compressor at a water surface down to the diver while the diver is underwater, the air hose having a first end associated with the air compressor and a second end associated with the diver, the system comprising:

a plurality of sensors attached to the air hose while the air hose is underwater, each sensor of the plurality of sensors embedded or integrated into a surface area of the air hose at various different depth levels along the air hose to allow data to be collected by the plurality of sensors at a column of depths extending from the water surface to a depth of the diver; the plurality of sensors comprising a data recorder sensor automatically calibrated for integration into a data recording device, the data recording device receiving the environmental health data at points along the air hose without any additional action by the diver aside from normal use of the self-contained surface supplied air system;

a microcontroller disposed within the floatable body member, the plurality of sensors in electronic communication with the microcontroller, the microcontroller is programmed to receive the data from the plurality of sensors for further processing;

wherein the second end of the air hose is split into two separate air travel passageways with a first passageway adapted for connection to a diver mouthpiece/regulator and a second passageway adapted for connection to a wireless receiver or handheld device;

wherein the handheld device comprises a pressure transmitter, a second microcontroller and an audible buzzer; wherein the second microcontroller constantly monitors pressure readings in the air hose and compares the readings with a predetermined distinct pattern; where a detected pattern is determined by the microcontrollers and the microcontrollers send a signal to turn on the audible buzzer to alert the diver that a battery for the self-contained surface supplied air system is reaching an unsafe low voltage.

\* \* \* \* \*